US012781855B2

(12) United States Patent
Zitting

(10) Patent No.: US 12,781,855 B2
(45) Date of Patent: Nov. 3, 2026

(54) PLUNGER PUMP PACKING ASSEMBLY

(71) Applicant: Daniel K. Zitting, St. George, UT (US)

(72) Inventor: Daniel K. Zitting, St. George, UT (US)

(*) Notice: Subject to any disclaimer, the term of this patent is extended or adjusted under 35 U.S.C. 154(b) by 0 days.

(21) Appl. No.: 18/998,924

(22) PCT Filed: Jul. 27, 2023

(86) PCT No.: PCT/US2023/071161
§ 371 (c)(1),
(2) Date: Jan. 27, 2025

(87) PCT Pub. No.: WO2024/026432
PCT Pub. Date: Feb. 1, 2024

(65) Prior Publication Data

US 2025/0257798 A1 Aug. 14, 2025

Related U.S. Application Data

(60) Provisional application No. 63/369,579, filed on Jul. 27, 2022.

(51) Int. Cl.
*F16J 15/20* (2006.01)
*F16J 15/18* (2006.01)

(52) U.S. Cl.
CPC ............. *F16J 15/20* (2013.01); *F16J 15/183* (2013.01)

(58) Field of Classification Search
CPC ............. F16J 15/20; F16J 15/183; F16J 15/18
See application file for complete search history.

(56) References Cited

U.S. PATENT DOCUMENTS

| | | | | |
|---|---|---|---|---|
| 4,193,481 | A * | 3/1980 | Wunderlich | F16D 65/54 188/73.31 |
| 4,440,404 | A | 4/1984 | Roach et al. | |
| 4,474,382 | A | 10/1984 | Hjelsand | |
| 4,635,945 | A | 1/1987 | Beck | |
| 5,135,238 | A | 8/1992 | Wells et al. | |
| 5,911,443 | A | 6/1999 | Le Quere | |
| 9,435,454 | B2 | 9/2016 | Blume | |
| 9,534,691 | B2 | 1/2017 | Miller et al. | |
| 9,845,801 | B1 * | 12/2017 | Shek | F04B 53/02 |
| 10,837,556 | B2 | 11/2020 | Chase et al. | |
| 11,143,305 | B1 | 10/2021 | Matthys et al. | |
| 2003/0160395 | A1 | 8/2003 | Walden | |

(Continued)

*Primary Examiner* — Gilbert Y Lee

(74) *Attorney, Agent, or Firm* — Gurr & Brande, PLLC; Robert A. Gurr

(57) ABSTRACT

A plunger pump packing assembly includes a header ring, and one or more seals. The plunger pump packing assembly operates as a seal between a static component and a dynamic component (e.g., reciprocating plunger). The header ring has a vented inside portion to prevent trapping pressure on the outer diameter of the header ring or between the header ring and adjacent seals or packing rings. The vents allow trapped pressure to return when the pumped fluid pressure is lower. A radially protruding edge on the outer diameter of the header ring significantly reduces or prevents migration of abrasive media, such as proppant, between the header ring and the static component. In some examples, the header ring does not contact the dynamic component, thus preventing the trapping of abrasive media particles between the header ring and the surface of the dynamic component.

19 Claims, 7 Drawing Sheets

(56) References Cited

U.S. PATENT DOCUMENTS

| | | | | |
|---|---|---|---|---|
| 2004/0173976 | A1* | 9/2004 | Boggs | F16J 15/164 277/628 |
| 2007/0216108 | A1 | 9/2007 | Zitting et al. | |
| 2012/0037389 | A1 | 2/2012 | Jagdale et al. | |
| 2019/0170137 | A1 | 6/2019 | Chase et al. | |
| 2024/0102557 | A1* | 3/2024 | Hashemian | F16J 15/441 |

* cited by examiner

PLUNGER PUMP PACKING ASSEMBLY

CROSS-REFERENCE TO RELATED APPLICATIONS

This application claims the benefit of U.S. Provisional Application Ser. No. 63/369,579, filed on Jul. 27, 2022, which is incorporated herein by reference.

TECHNICAL FIELD

The present disclosure relates to plunger pump packing assemblies and other packing assemblies.

BACKGROUND

Packing assemblies are used in many reciprocating plunger pumps. In the oil and gas industry, large reciprocating pumps are used in well drilling and completions to pump drilling mud, cement, and well stimulation fluids. For operations in hydraulic fracturing, pumps in excess of 3000 HP may be used to pump pressures to 20,000 psi (137.9 MPa) in order to create fractures in rock. The packing set seals around the reciprocating plunger to prevent escape of the pumped fluid. Some pumps in the art include an adjustable space for the packing, referred to as a stuffing box or packing gland, located between a static component and the plunger. A gland/compression nut may be used to adjust the length of the space in which the packing set is assembled. Thus, the seal can be adjusted by tightening the gland nut, which is typically threaded into the fluid end. A typical packing has one or more vee packing elements, which expand or press radially toward the plunger by reacting to the force in the axial direction from the gland nut and fluid pressure.

These vee packing elements may be the main pressure seal in the packing—typically rubber or polytetrafluoroethylene (PTFE) and may be reinforced with various fabrics, granular fillers, or randomly oriented fibers. The header ring is typically rubber or another elastomer that may also be reinforced.

When used in the drilling and completion of wells, these pumps may be used at high pressures pumping aggressive fluids and abrasive media (e.g., proppant). Improper function of these seals can cause damage to the pump housing and plunger. Failure of the packing set can lead to the unintended leakage of fluids laden with abrasive media, which can quickly erode metal parts of the pump, requiring costly replacement. Frequent adjustment or replacement of these packing sets to avoid failure result in high maintenance costs and additional staff working at the well site.

Accordingly, there is a need to prevent abrasive media from migrating between the packing and the plunger and from the packing and the first component. There is a further need to prevent trapping of pressure on the outer diameter of the header ring, and/or between the header ring and subsequent seals, such as vee packing ring(s). The present disclosure seeks to solve these and other problems.

SUMMARY OF EXAMPLE EMBODIMENTS

In some embodiments, a packing assembly comprises a header ring that provides axial compression force to adjacent seals or packing rings, such as vee packing rings. The header ring comprises a vented inside portion to prevent trapping pressure on the outer diameter of the header ring or between the header ring and adjacent seals or packing rings. The vent allows trapped pressure to return when the pumped fluid pressure is lower (typically on each pump intake stroke).

In some embodiments, a radially protruding edge on the outer diameter of the header ring prevents migration of particles between the header ring and the static component. In a preferred embodiment, the header ring does not contact the dynamic component (e.g., reciprocating plunger), thus preventing the trapping of abrasive media particles between the header ring and the dynamic component surface. Adjacent seals or packing rings can be configured with abrupt edges to prevent the abrasive media particles from migrating further between the seals or packing components and the dynamic component.

DETAILED DESCRIPTION OF EXAMPLE EMBODIMENTS

Figure 1:
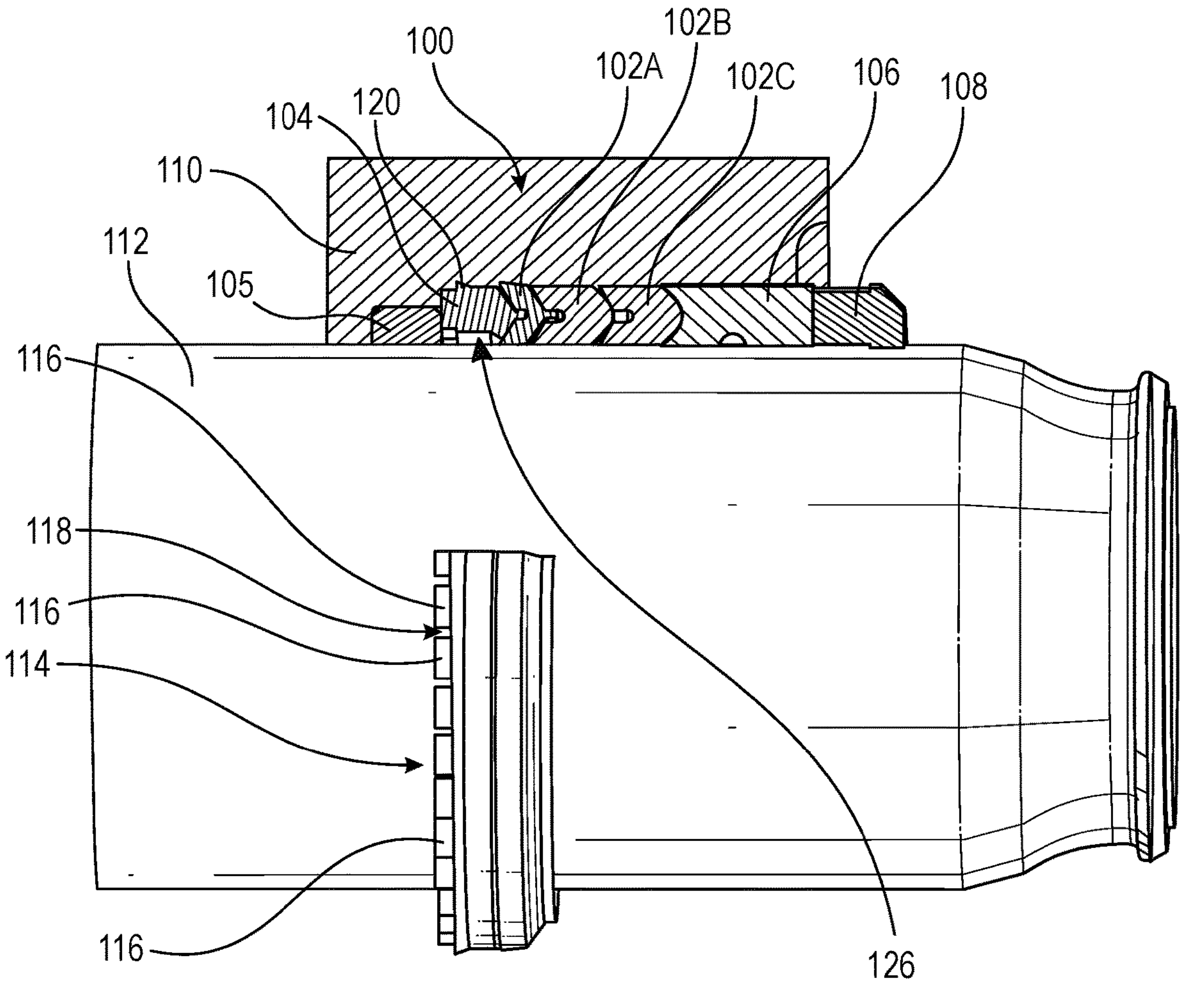
FIG. 1 illustrates a partial cut-away, side elevation view of a packing assembly.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described.

As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, there is a need for plunger pump packing that prevents abrasive media from migrating between the packing and the plunger, to prevent abrasive media from migrating between the packing and the static component, and to prevent trapping of pressure on the outer diameter of the header ring and/or between the header ring and subsequent seals. The packing assembly disclosed herein solves these and other problems.

Figure 2:
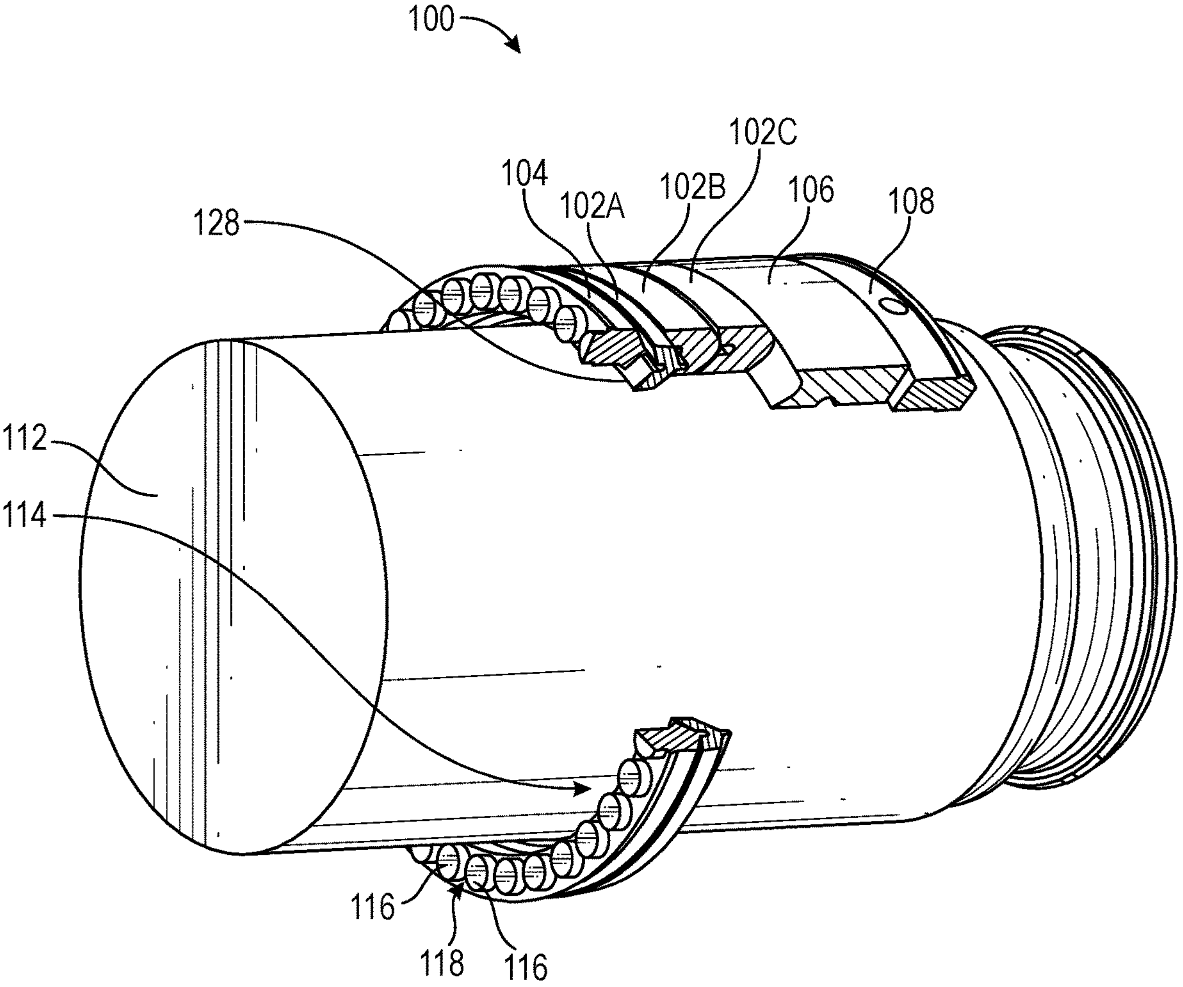
FIG. 2 illustrates a partial cut-away, front, side perspective view of a packing assembly.
Figure 3:
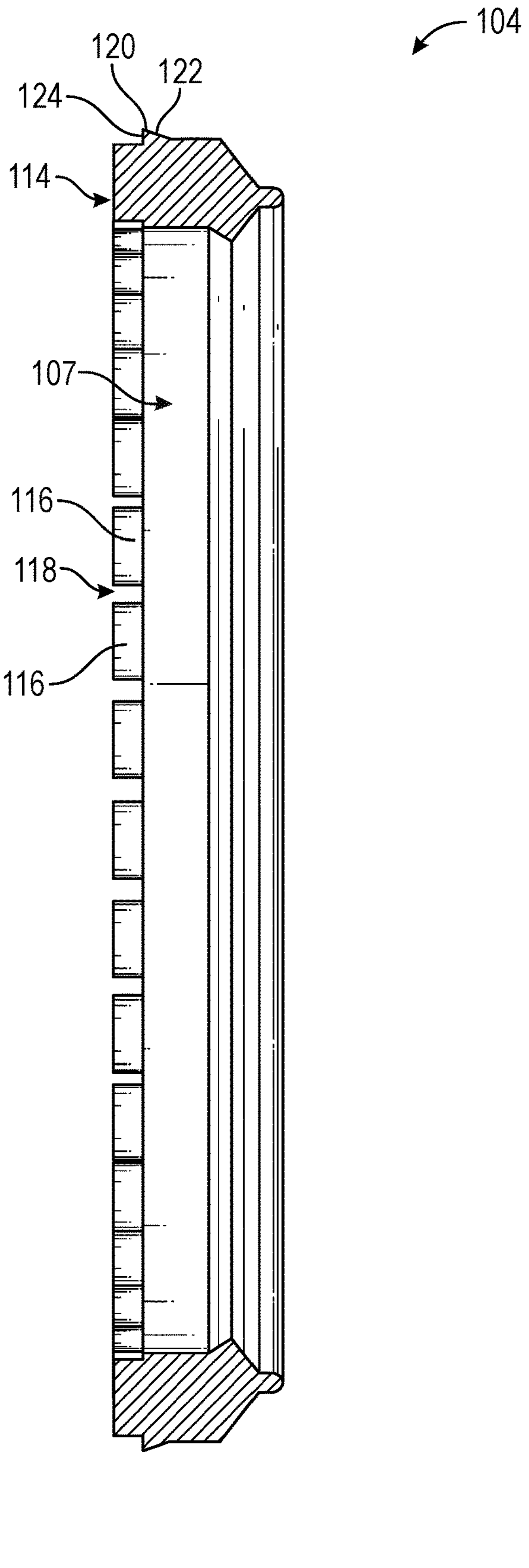
FIG. 3 illustrates a cross-section of a side elevation view of a header ring.

In some embodiments, as shown in FIGS. 1-3, a packing assembly 100 comprises one or more seals 102A-C (e.g., vee packing rings, U-cups, etc.), a header ring 104, a spacer 106, and a lantern ring 108. The packing assembly 100 may be constrained axially to provide a pre-load on the header ring 104 and seals 102A-C. For example, a compression nut (not shown) may abut the lantern ring 108 and adjustably impart axial force on the lantern ring 108. The plunger pump packing assembly 100 may operate as a seal between a static component 110 and a dynamic component 112 (e.g., reciprocating plunger or other shaft). For example, the seals 102A-C may comprise one or more of rubber, PTFE, polyurethane, UHMWPE, fabrics, granular fillers, fibers, etc. In some embodiments, each seal 102A-C may comprise the same materials, but may also comprise different materials. For example, the first seal 102A may comprise polyurethane while a second seal 102B may comprise fabric-reinforced rubber. The header ring 104 may comprise rubber or other elastomer, which may or may not be reinforced. While FIGS. 1 and 2 illustrate cutaways for ease of understanding, it will be appreciated that the seals 102A-C, header ring 104, spacer 106, and lantern ring 108 each encircle the dynamic component 112.

In some embodiments, the header ring 104 comprises a vented inside portion 114 to prevent trapping pressure on the outer diameter of the header ring 104 or between the header ring 104 and adjacent seals or seals 102A-C. The vented inside portion 114 may be formed from a plurality of protrusions 116 and apertures 118 on a first side of the header ring 104. The plurality of protrusions 116 are sized and shaped so as to form an aperture 118 between each protrusion 116. In some embodiments, the protrusions 116 are cylindrical. However, it will be appreciated that the protrusions 116 may comprise other formfactors without departing herefrom (e.g., cubed, triangular, hexagonal, etc.).

Figure 4:
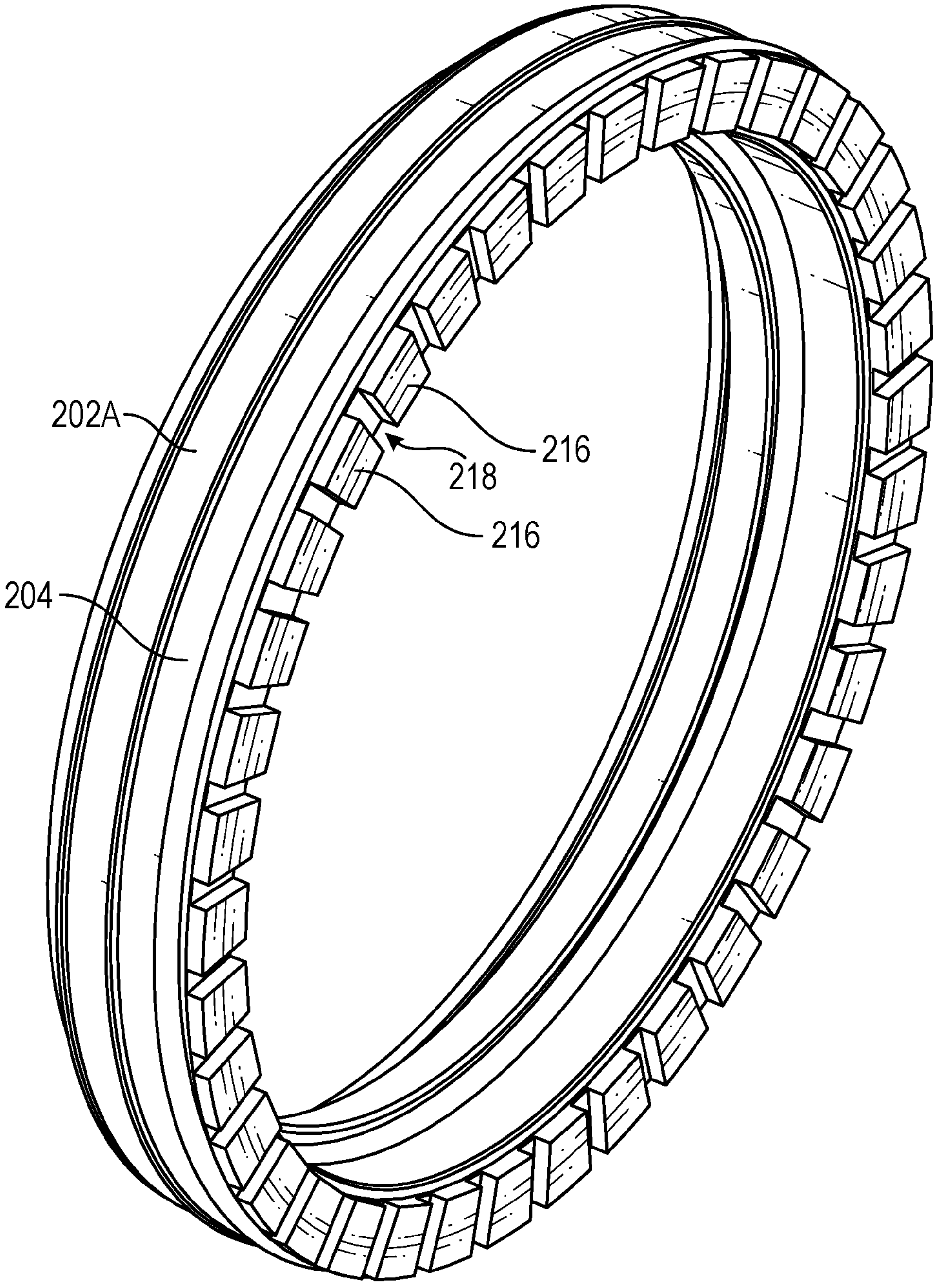
FIG. 4 illustrates a front perspective view of a header ring and seal of a packing assembly.
Figure 5:
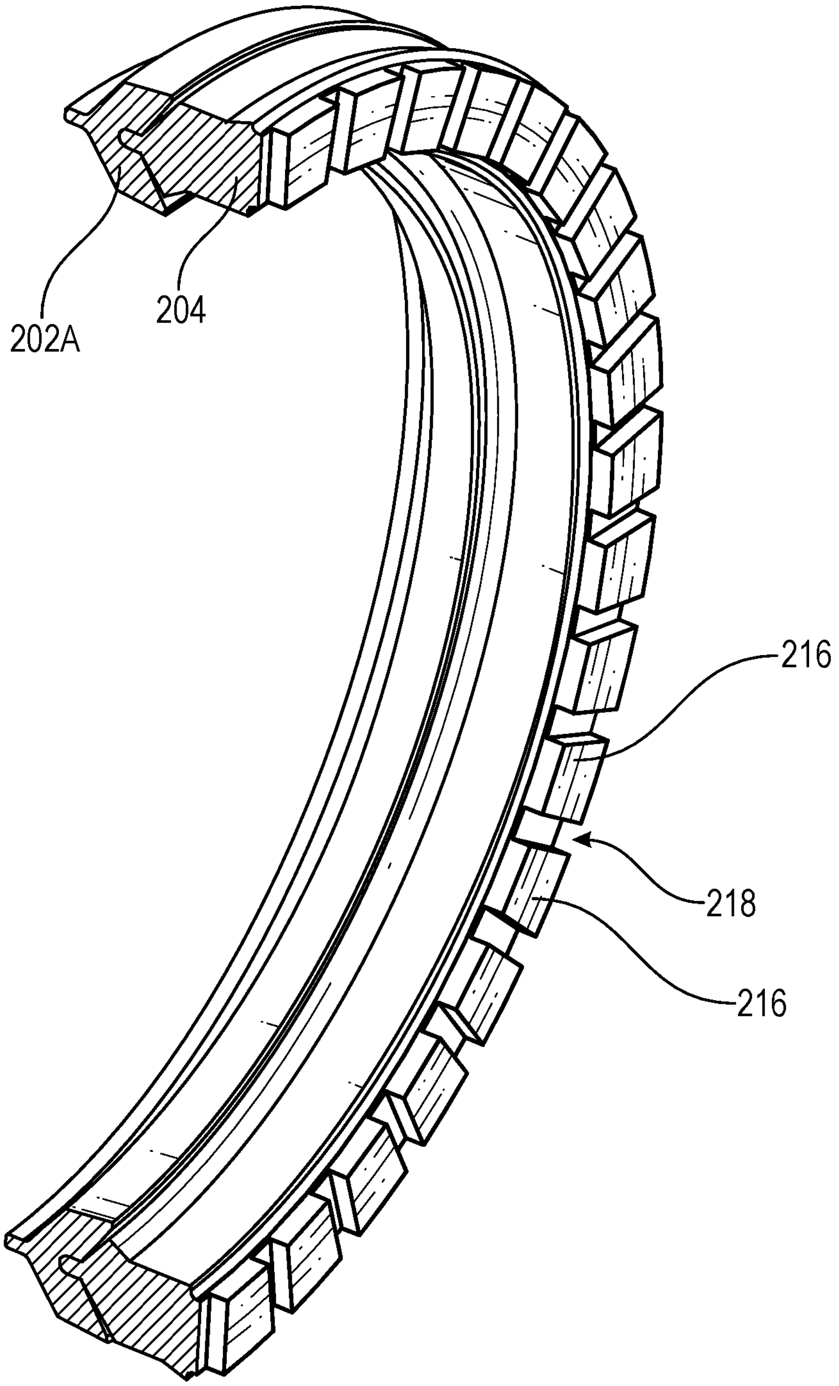
FIG. 5 illustrates a cross-section of a front perspective view of a header ring and seal of a packing assembly.

For example, FIGS. 4-5 illustrate a header ring 204 coupled to a seal 202A (e.g., vee packing ring), the header ring 204 comprising a plurality of cube-shaped protrusions 216 and apertures 218 therebetween. Returning to FIG. 3, the apertures 118 function as vents, allowing trapped pressure to return when the pumped fluid pressure is lower (typically on each pump intake stroke). By reducing trapped pressure, the packing assembly 100 is less subject to deformation and wear, preventing media from wearing down the seals 102A-C (e.g., vee packing rings 102A-C) and extending the life of the assembly 100 and the pump.

By utilizing a plurality of spaced protrusions 116, the apertures 118 remain even when the header ring 104 is subjected to axial pressure, deforming the protrusions 116. Wider apertures 118 (i.e., distance between adjacent protrusions), allow for greater axial compression without blocking the apertures 118 due to deformation of the protrusions 116. Apertures 118 of sufficient width, depth, and number provide space for axial compression of protrusions 116 by allowing space for deformation of the protrusion 116 into the apertures 118, thereby allowing axial deformation pre-load force to be adequate over a greater tolerance of axial constraint distance. For example, apertures 118 with a depth of 1 mm (face of protrusion 116 is 1 mm distance from surface) remove about 10% of the material volume to that 1 mm depth (i.e., 10% of the vented portion) as compared to a continuous annulus. However, the depth and percentages may change, depending on the number of apertures 118 as well. For example, a depth of 0.75 mm may still result in 20% removal of material volume to that 0.75 mm depth. If the vented portion 114 were mostly a solid annulus with, for example, four small apertures 118 to vent (meaning a smaller percentage (e.g., less than 10%) of material volume removed) to the depth of the apertures, the axial compression of the packing assembly 100 would reach a high axial force in a very small distance. As a result, adjusting the axial force, which in turn adjusts the seals' 102A-C contact force on the dynamic component 112 and static component 110, would be very sensitive and require skilled labor. In contrast, by increasing the number of apertures 118 and/or their size, and thereby the material volume to be reduced (e.g., 10% or more), there is increased space for deformation (adequate apertures volume), which makes the axial force build up over a longer distance of axial compression. Thus, the adjustment of seals force is less sensitive. As another example, in some embodiments, a plurality of apertures having a depth of 2 mm removes 25% of the volume to the 2 mm depth of the apertures (i.e., 25% of the vented portion 114). With at least a 10% reduction in volume, and preferably 25%, of the vented portion 114, the header ring 104 has greater compressibility, making it a more effective axial spring to load the seals, which overcomes limitations in the art.

Some pumps have non-adjustable axial constrained packing housings (e.g., bolted together). In those instances, the greater axial deformation to reach a specific axial compression force makes the packing assembly less sensitive to packing housing fixed lengths (and manufacturing tolerances). Furthermore, for any packing housing axial constraint length, whether fixed or initially adjusted, the wear and relaxation of packing assembly components results in less reduction in sealing force over time due to the increase axial compression and resilience of the protrusions 116 which were deformed.

In some embodiments, the protrusions 116 may abut a junk ring 105, the junk ring 105 applying pressure to the protrusions 116 as discussed above. As the header ring 104 cause wear on the junk ring 105, the junk ring 105 may be replaced. However, it will be appreciated that while the packing assembly 100 shown in the FIGS. includes a junk ring 105, spacer 106 (which may act as a guide to center a plunger), multiple seals 102A-C, and a lantern ring 108 (typically included for distribution of lubrication), not each of those components is required, depending on the pump and desired configuration by the user. In other configurations, some components are combined into a single component, such as the spacer 106 and lantern ring 108, or as described later herein, the header ring 104 and a seal.

In some embodiments, as best seen in FIGS. 1 and 3, a radially protruding edge 120 on the outer diameter of the header ring 104 significantly reduces or prevents migration of abrasive media, such as proppant, between the header ring 104 and the static component 110. This radially protruding edge 120 abuts the static component 110 and may function as a one-way valve, allowing fluid or built-up pressure to pass from the direction of the first seal 102A, over a sloped face 122 (FIG. 3) of the protruding edge 120 and to the vented portion 114, as pressure trapped between the first seal 102A and protruding edge 120 may force the material of header ring 104 radially inward toward a channel 126, thereby reducing the contact force of protruding edge 120. However, because pressure acting inside the header ring 104 increases the contact force of the protruding edge 120 to the static component 110, fluid and pressure is significantly reduced or prevented from going from the vented portion 114 to the first seal 102A. Because abrasive media and pressure is prevented from passing past the front side 124 of the protruding edge 120, the life of the seals or packings 102A-C is extended, overcoming limitations in the prior art. In some embodiments, the radially protruding edge 120 may comprise a substantially perpendicular face on a first side and a sloped face on a second side. However, other form-factors may be used without departing herefrom. Additionally, while a protruding edge 120 is described as extending radially from the header ring 104, alternate means of achieving a similar result may be used without departing herefrom. For example, rather than a protruding edge, the header ring 104 may comprise an outer diameter greater than the inner diameter of the static component 110, thereby providing similar functionality as the protruding edge 120.

Further, in some embodiments, the header ring 104 does not contact the reciprocating plunger 112 (or other dynamic surface), thus preventing the trapping of abrasive media particles between the header ring 104 and the surface of the plunger 112. For example, referring to FIG. 3, the header ring 104 may comprise a formfactor, such as a contour 107 on a first portion of the inner diameter, forming channel 126 between the outer surface of the plunger 112 and at least a portion of the inner diameter of the header ring 104. The header ring 104 may maintain its relative position by being coupled to the adjacent seal 102A (or other first component), such as by tongue and groove or other shape or interference fit, adhesives, or other methods of coupling the header ring 104 to the seal 102A. As a result, the channel 126 is maintained and the first component to engage the plunger 112 is the first seal 102A. In this and other embodiments, the seals 102A-C may comprise an abrupt edge 128 (FIG. 2) to prevent abrasive media particles from migrating further between the seals (e.g., seals 102A-C) and the plunger 112. It will be appreciated that one or more seals 102A-C may comprise abrupt edges to thereby prevent any abrasive media from continuing to migrate should it succeed in passing a first seal 102A. In some embodiments, the abrupt edge 128 may be a first portion of the seal 102A to contact the outer surface of the plunger 112, the abrupt edge 128 being at an angle of 30 degrees or more in relation to the outer surface of the plunger 112. Because there is no contact between the inner diameter surface of the header ring 104 and the plunger 112, and due to the vented portion 114, pressure is able to be released and not build up on the outer diameter of the header ring 104, overcoming the prior art.

Figure 6:
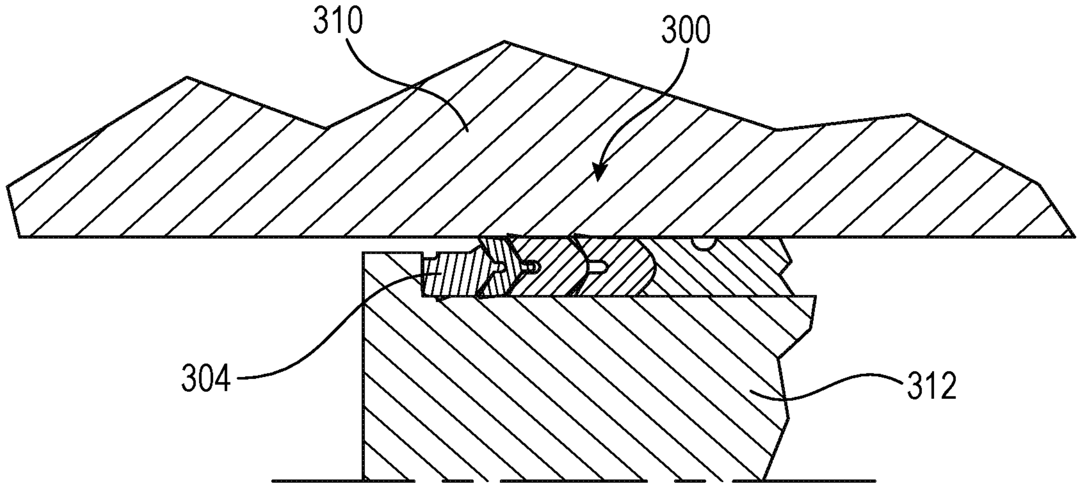
FIG. 6 illustrates a partial cross-section of a packing assembly in an alternate embodiment.

It will be appreciated that while three seals 102A-C are shown, more or fewer may be used without departing herefrom. Additionally, it will be appreciated that while the packing assembly 100 is shown on the outer circumference of the plunger 112, it is not limited to such placement. In some embodiments, as shown in FIG. 6, the packing assembly 300 may be inverted for use on an inner diameter of a surface. In other words, the header ring 304 encircles a piston 312 which, together with the packing assembly 300, is dynamic in relation to a cylindrical bore 310. Lastly, while an example of a plunger 112 was used, it will be appreciated that any dynamic (i.e., moving) component may be used without departing herefrom.

Figure 7:
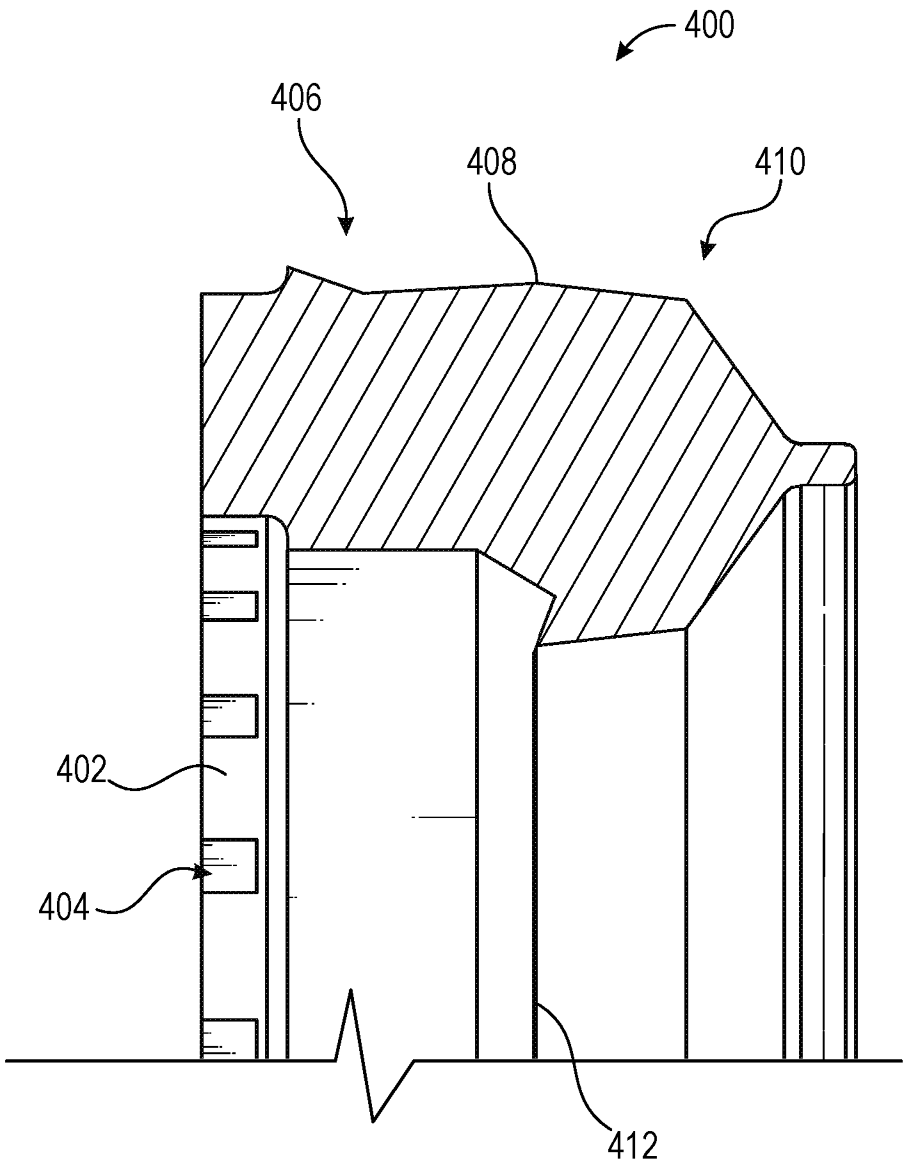
FIG. 7 illustrates a partial cross-section of a header ring and seal combined into a single item of manufacture.

In some embodiments, as shown in FIG. 7, the header ring and the first seal may be combined into a single item of manufacture, rather than two separate items that are coupled together. In other words, the header ring 400 may comprise a plurality of protrusions 402 and apertures 404 on a first portion 406 and a seal 408 on the second portion 410, the second portion 410 comprising the abrupt edge 412.

Accordingly, the header ring 104, 204, 304, 400 of the packing assembly 100, 300 solves the need to 1) prevent abrasive media from migrating between the packing assembly 100 and the plunger 112; 2) prevent abrasive media from migrating from the packing assembly 100 and the static component 110; and 3) prevent trapping of pressure on the outer diameter of the header ring 104, 204, 304, 400, and/or between the header ring 104, 204, 304, 400 and subsequent seals 102A-C.

It will be appreciated that systems and methods according to certain embodiments of the present disclosure may include, incorporate, or otherwise comprise properties or features (e.g., components, members, elements, parts, and/or portions) described in other embodiments. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment unless so stated. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A reciprocating plunger pump packing assembly, comprising:
   - a header ring and at least one seal, the header ring comprising:
     - a first side comprising a vented portion, the vented portion comprising a plurality of protrusions extending axially, each protrusion separated by a respective aperture, each protrusion configured to deform into the respective apertures when under an axial force to provide for greater axial compressibility of the header ring,
     - a second side configured to couple to the at least one seal,
     - a radially protruding edge on an outer circumference, and
     - a channel formed between an inner diameter of the header ring and an outer surface of a dynamic component, wherein the radially protruding edge and the channel are in the same axial plane, and
     - wherein the radially protruding edge is configured to abut an inner surface of a static component and is configured to allow fluid to pass from the outer circumference to the vented portion and is further configured to prohibit a fluid and abrasive media from passing from the vented portion around the outer circumference;
   - the header ring and the at least one seal configured to encircle an outer surface of the dynamic component; and
   - wherein at least an abrupt edge of the at least one seal contacts the outer surface of the dynamic component.

2. The reciprocating plunger pump packing assembly of claim 1, wherein each protrusion is cylindrical.

3. The reciprocating plunger pump packing assembly of claim 1, wherein each protrusion is cubed.

4. The reciprocating plunger pump packing assembly of claim 1, wherein each protrusion is formed by removing portions of the header ring, forming the aperture between each, the apertures removing at least 10 percent of a material volume of the vented portion.

5. The reciprocating plunger pump packing assembly of claim 1, further comprising a compression nut, wherein the at least one seal is a vee packing ring, the vee packing ring interposed between the compression nut and the header ring.

6. The reciprocating plunger pump packing assembly of claim 1, wherein the abrupt edge is at least at a 30-degree angle in relation to the dynamic component.

7. A reciprocating plunger pump packing assembly, comprising:
   - a header ring, comprising:
     - a first side comprising a plurality of protrusions and apertures forming a vented portion, the plurality of protrusions deformable into the respective apertures for increasing axial compressibility of the header ring,
     - a second side configured to couple to a vee packing ring, and
     - a radially protruding edge on an outer circumference configured to abut an inner surface of a static component;
   - wherein the header ring and vee packing ring are configured to encircle an outer surface of a dynamic component,
   - the vee packing ring comprising an abrupt edge on a first side;
   - wherein a channel is formed between an inner diameter of the header ring and the outer surface of the dynamic component, the channel positioned radially opposite the radially protruding edge and in the same axial plane as the radially protruding edge, and
   - wherein at least the abrupt edge of the vee packing ring contacts the outer surface of the dynamic component.

8. The reciprocating plunger pump packing assembly of claim 7, wherein the plurality of protrusions on the first side of the header ring are cylindrical or cuboidal.

9. The reciprocating plunger pump packing assembly of claim 7, wherein the radially protruding edge comprises a substantially perpendicular face on a first side and a sloped face on a second side, the radially protruding edge configured to allow fluid to pass over the sloped face and to the vented portion, the substantially perpendicular face prohibiting fluid to pass to the sloped face from the vented portion.

10. The reciprocating plunger pump packing assembly of claim 7, wherein the apertures comprise a volume of at least 10 percent of the vented portion.

11. A reciprocating plunger pump packing assembly, comprising:
   - a header ring, comprising:
     - a first side comprising a plurality of protrusions and apertures forming a vented portion, the plurality of protrusions extending axially from the first side and configured to deform under contact pressure into the respective apertures to provide for greater axial compressibility of the header ring, a second side configured to couple to at least one seal,
     - a radially protruding edge on an outer circumference and interposed between the first side and the second side and configured to abut an inner surface of a static component, the radially protruding edge configured to allow fluid to pass from the second side of the radially protruding edge to the vented portion of the header ring and is further configured to prohibit the fluid and abrasive media from passing from the vented portion around the outer circumference, and
     - a contour on at least a portion of an inner diameter;
   - a first seal of the at least one seal comprising an abrupt edge on a first side for contacting an outer surface of a dynamic component, the abrupt edge interposed between the outer surface of the dynamic component and the header ring;
   - wherein the contour of the inner diameter forms a channel between at least a portion of the inner diameter of the header ring and the outer surface of the dynamic component, the radially protruding edge opposite the channel and in the same axial plane; and
   - wherein the header ring and the at least one seal are each configured to encircle the outer surface of the dynamic component, the packing assembly functioning as a seal between the static component and the dynamic component.

12. The reciprocating plunger pump packing assembly of claim 11, wherein each protrusion is cylindrical.

13. The reciprocating plunger pump packing assembly of claim 11, wherein each protrusion is cubed.

14. The reciprocating plunger pump packing assembly of claim 11, wherein the apertures collectively remove at least 10 percent of a material volume of the header ring to the depth of the apertures.

15. The reciprocating plunger pump packing assembly of claim 11, wherein the at least one seal is a vee packing ring.

16. The reciprocating plunger pump packing assembly of claim 11, wherein the abrupt edge is at least at a 30-degree angle in relation to the dynamic component.

17. A reciprocating plunger pump packing assembly, comprising:

a header ring, comprising:

a first side comprising a plurality of protrusions and apertures forming a vented portion, the plurality of protrusions configured to deform under axial force into the respective apertures, a second side comprising a seal, the seal comprising an abrupt edge configured to contact the outer surface of the dynamic component, a radially protruding edge on an outer circumference configured to abut a static component, and wherein the header ring is configured to encircle an outer surface of a dynamic component, wherein an aperture is formed between a first portion of the header ring and the outer surface of the dynamic component, the aperture positioned radially opposite the radially protruding edge and in the same axial plane.

18. The reciprocating plunger pump packing assembly of claim 17, wherein the abrupt edge is at least at a 30-degree angle in relation to the dynamic component.

19. The reciprocating plunger pump packing assembly of claim 17, wherein the apertures collectively comprise at least 10 percent by volume of the vented portion.

* * * * *